US012660798B2

(12) United States Patent
Beatty et al.

(10) Patent No.: US 12,660,798 B2
(45) Date of Patent: Jun. 23, 2026

(54) SELF-RIGHTING CAT TOYS

(71) Applicant: Logical Brands, Inc., Nashville, TN (US)

(72) Inventors: Lendy Beatty, Franklin, TN (US); Craig Olroyd, Santa Barbara, CA (US)

(73) Assignee: Logical Brands, Inc., Nashville, TN (US)

( * ) Notice: Subject to any disclaimer, the term of this patent is extended or adjusted under 35 U.S.C. 154(b) by 0 days.

(21) Appl. No.: 19/081,051

(22) Filed: Mar. 17, 2025

(65) Prior Publication Data

US 2025/0295093 A1 Sep. 25, 2025

Related U.S. Application Data

(60) Provisional application No. 63/567,085, filed on Mar. 19, 2024.

(51) Int. Cl.
*A01K 15/02* (2006.01)
*A63H 15/06* (2006.01)

(52) U.S. Cl.
CPC ................................. *A01K 15/025* (2013.01)

(58) Field of Classification Search
CPC ................ A01K 15/025; A01K 15/257; A01K 15/0201; A01K 5/0114; A63H 15/06
See application file for complete search history.

(56) References Cited

U.S. PATENT DOCUMENTS 2,193,645 A     3/1940  Raizen et al.
2,632,977 A  *  3/1953  Valasek ................... A63H 15/06
                                                   446/325

2,833,244 A     5/1958  Bohlman
3,805,444 A  *  4/1974  Adickes ................. A63H 15/06
                                                   428/15
4,522,604 A     6/1985  Stubbmann
(Continued)

FOREIGN PATENT DOCUMENTS

CN        2113818 U      8/1992
CN      208480477 U      2/2019
(Continued)

OTHER PUBLICATIONS

International Search Report and Written Opinion for PCT/US2025/020159 dated Apr. 17, 2025.
(Continued)

*Primary Examiner* — Kristen C Hayes
(74) *Attorney, Agent, or Firm* — Hansen IP Law PLLC

(57) ABSTRACT

A self-righting cat toy is shown and described. The toy can be tilted with a tilting force, but when the tilting force is released, the toy returns to an upright position without any further action on the part of the user. Thus, the toy gives the appearance of "wobbling" when it is tilted and released. An upper conical section of the toy is made from an ABS (acrylonitrile-butadiene-styrene) block copolymer material that has a lower density than a thermoplastic rubber (TPR) material used to make a lower hemispherical section of the toy. The upper conical section and lower hemispherical section snap-fittingly engage one another, which facilitates the use of different materials for the upper and lower sections and which also allows bells, food, or other engaging items to be placed in the interior of the toy.

20 Claims, 3 Drawing Sheets

(56)  References Cited

U.S. PATENT DOCUMENTS

| | | | | |
|---|---|---|---|---|
| 6,217,408 | B1 | 4/2001 | Willinger | |
| 7,028,428 | B1 | 4/2006 | Spencer | |
| D661,031 | S | 5/2012 | Christianson | |
| D704,396 | S | 5/2014 | Chen | |
| 9,301,504 | B2 * | 4/2016 | Wurth | A01K 15/026 |
| 9,596,831 | B2 | 3/2017 | Christensen | |
| 2011/0083608 | A1 * | 4/2011 | Markham | A01K 5/0114 |
| | | | | 119/51.01 |
| 2014/0270931 | A1 | 9/2014 | Jager | |
| 2014/0360439 | A1 | 12/2014 | Christensen | |
| 2019/0053467 | A1 | 2/2019 | Foley | |

FOREIGN PATENT DOCUMENTS

| | | | | | |
|---|---|---|---|---|---|
| CN | 115399250 | A | * | 11/2022 | A01K 5/0114 |
| JP | 2002078430 | A | | 3/2002 | |
| WO | 2017138805 | A1 | | 8/2017 | |
| WO | WO-2019107399 | A1 | * | 6/2019 | A63H 33/00 |

OTHER PUBLICATIONS

English translation of WO2017138805A1 from Total Patent One.
English translation of JP2002078430A from Total Patent One.
English translation of CN208480477U from Total Patent One.
English translation of CN2113818U from Total Patent One.

* cited by examiner

SELF-RIGHTING CAT TOYS

CROSS-REFERENCE TO RELATED APPLICATIONS

This application claims the benefit of U.S. Provisional Patent Application No. 63/567,085, filed Mar. 19, 2024, the entirety of which is hereby incorporated by reference.

FIELD

The present disclosure relates to animal toys, and more particularly, to cat toys comprising insects or small animals with a life-like appearance.

BACKGROUND

Regular exercise and stimulating engagement are beneficial for domestic cats. They build a bond between the cat and the cat's owner and reduce the cat's propensity for destructive behavior due to boredom and unspent energy. A variety of different toys have been developed for playing with domestic cats. Cats will engage such toys to a varying degree based on how stimulating the toys are.

Certain toys have been developed which are "self-righting," meaning that if a pet cat paws the toy, it will just return to an upright condition on its own instead of merely falling over. However, known self-righting toys are cumbersome in construction, and expensive to produce. Thus, a need has arisen for an improved self-righting toy.

SUMMARY

In accordance with a first aspect of the present disclosure, a cat toy is provided which comprises a conical upper section having a height defining a height axis and a radial axis and a hemispherical lower section, wherein the conical upper section is made from a plastic material and the hemispherical lower section is made from an elastomeric material. In certain examples, the cat toy has a center of rotation and a center of gravity, wherein the center of rotation is spaced apart from the center of gravity along the height axis. In the same or other examples, the plastic material has a lower density than the elastomeric material. In the same or other examples, the conical upper section snap-fittingly engages the hemispherical lower section. In the same or other examples, the hemispherical lower section is solid throughout and the conical upper section as through openings from an exterior surface of the conical upper section to the hollower interior of the conical upper section.

In accordance with a second aspect of the present disclosure, a cat toy is provided which comprises a conical upper section having a height defining a height axis and a radial axis, wherein the conical upper section is formed from a first material having a first density The cat toy also comprises a hemispherical lower section formed from a second material having a second density, wherein the second density is greater than the first density, the conical upper section has a hollow interior and through-openings from an exterior surface of the conical upper section to the hollow interior, the hemispherical lower section is solid throughout, and wherein the cat toy has a center of rotation and a center of gravity, and the center of rotation is spaced above the center of gravity along the height axis.

BRIEF DESCRIPTION OF THE DRAWINGS

The disclosure will now be described, by way of example, with reference to the accompanying drawings, in which.

DETAILED DESCRIPTION

The present disclosure relates to self-righting cat toys, i.e., toys that "wobble" when struck by a cat. Toy 20 can be tilted by applying a tilting force above its center of rotation, but when the tilting force is released, the toy 20 return to an upright condition without any further action on the part of the user.

Figures 1, 2:
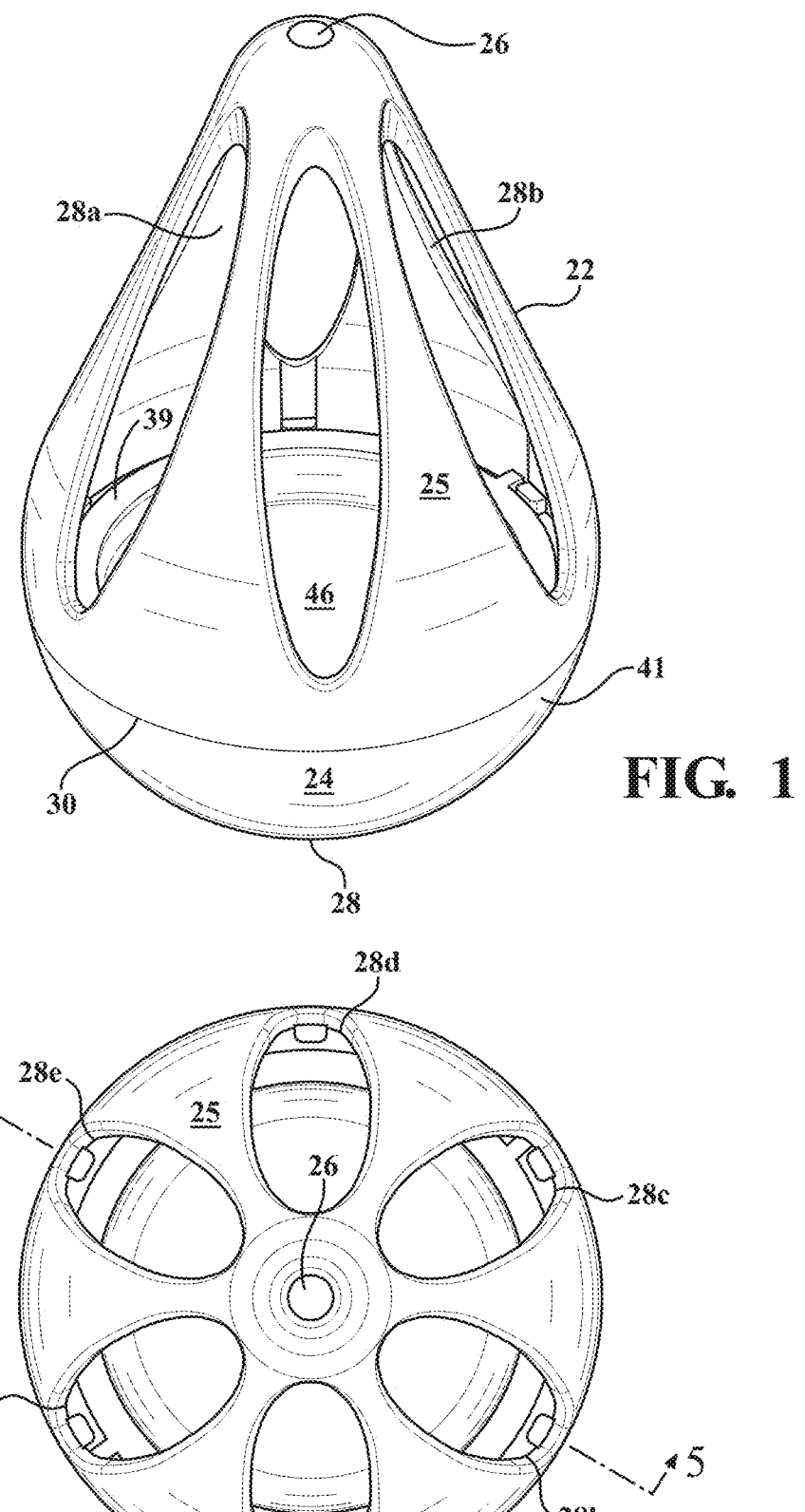
FIG. 1 is a side elevational view of a self-righting cat toy in accordance with the present disclosure.
FIG. 2 is a top plan view of the cat toy of FIG. 1.

Referring to FIG. 1, toy 20 is shown in an assembled condition. Toy 20 comprises a top end 26 and a bottom end 28 spaced apart along a height axis. Top end 26 is part of an upper conical section 22, and bottom end 28 is part of a lower hemispherical section 24. Upper conical section 22 is generally conical in shape and therefore also defines a radial axis which is parallel to cross-sectional planes taken along the height axis. Lower hemispherical section 24 also has a radial dimension associated with it, but because it is a hemisphere, its radius is also parallel to the height axis of the toy. Thus, when used herein, the term "radial axis" refers to an axis parallel to cross-section through lower hemispherical section along the height axis defined by upper conical section 22. The cross-sectional area perpendicular to the height axis and defined by exterior surface 25 decreases when moving from open bottom 30 to top end 26 along the height axis.

Upper conical section 22 and lower hemispherical section 24 are preferably made from different materials, and in preferred examples, upper conical section 22 has a density that is less than that of lower hemispherical section 24, preferably no more than about 95 percent of the density of lower hemispherical section 24, more preferably, no more than about 90 percent of the density of lower hemispherical section 24, and still more preferably, no more than about 85 percent of lower hemispherical section 24. In certain examples, upper conical section 22 has a density that is from about 0.95 to about 1.15 g/cm$^3$, preferably from about 0.98 g/cm$^3$ to about 1.12 g/cm$^3$, and more preferably from about 1.04 g/cm$^3$ to about 1.06 g/cm$^3$. In the same or other examples, lower hemispherical section 24 has a density that is from about 1.15 g/cm$^3$ to about 1.25 g/cm$^3$, preferably from about 1.17 g/cm$^3$ to about 1.23 g/cm$^3$, and more preferably from about 1.19 g/cm$^3$ to about 1.21 g/cm$^3$.

In addition to the geometries of upper conical section 22 and lower hemispherical section 24, the use of a relatively lower density material to form upper conical section 22 and a relatively higher density material to form lower hemispherical section 24 further enhances the self-righting capability of toy 20.

In the same or other examples, upper conical section 22 is formed from a plastic, and lower hemispherical section 24 is formed from an elastomer. In certain preferred implementations, upper conical section 22 comprises an acrylonitrile-butadiene-styrene (ABS) thermoplastic, and lower hemispherical section 24 comprises a thermoplastic elastomer (TPE). The TPE is preferably a blend of polyurethane, butadiene rubber, acrylic acid ester, and ethylene-propylene rubber. The upper conical section 22 and lower hemispherical section 24 are separately molded, preferably by injection molding and are attachable to one another by snap-fit engagement without the use of external fasteners or tools.

As used herein, the term "Shore A hardness" refers to a hardness determined in accordance with GB/T531.1-2008 (China Standard for Vulcanized or Thermoplastic-Determination of Indentation Hardness) which is equivalent to ISO7619-1-2004 and ASTM D2440. Upper conical section 22 has a Shore A hardness of from about 70 to about 90, preferably from about 75 to about 85, and more preferably, from about 78 to about 82. Lower hemispherical section 24 has a Shore A hardness of from about 30 to about 70, preferably from about 35 to about 65, and more preferably from about 40 to about 60. Upper conical section 22 has a tensile strength of from about 60 MPa to about 100 MPa, preferably from about 65 MPa to about 95 MPa, and more preferably from about 70 MPa to about 90 MPa.

Figures 3, 4:
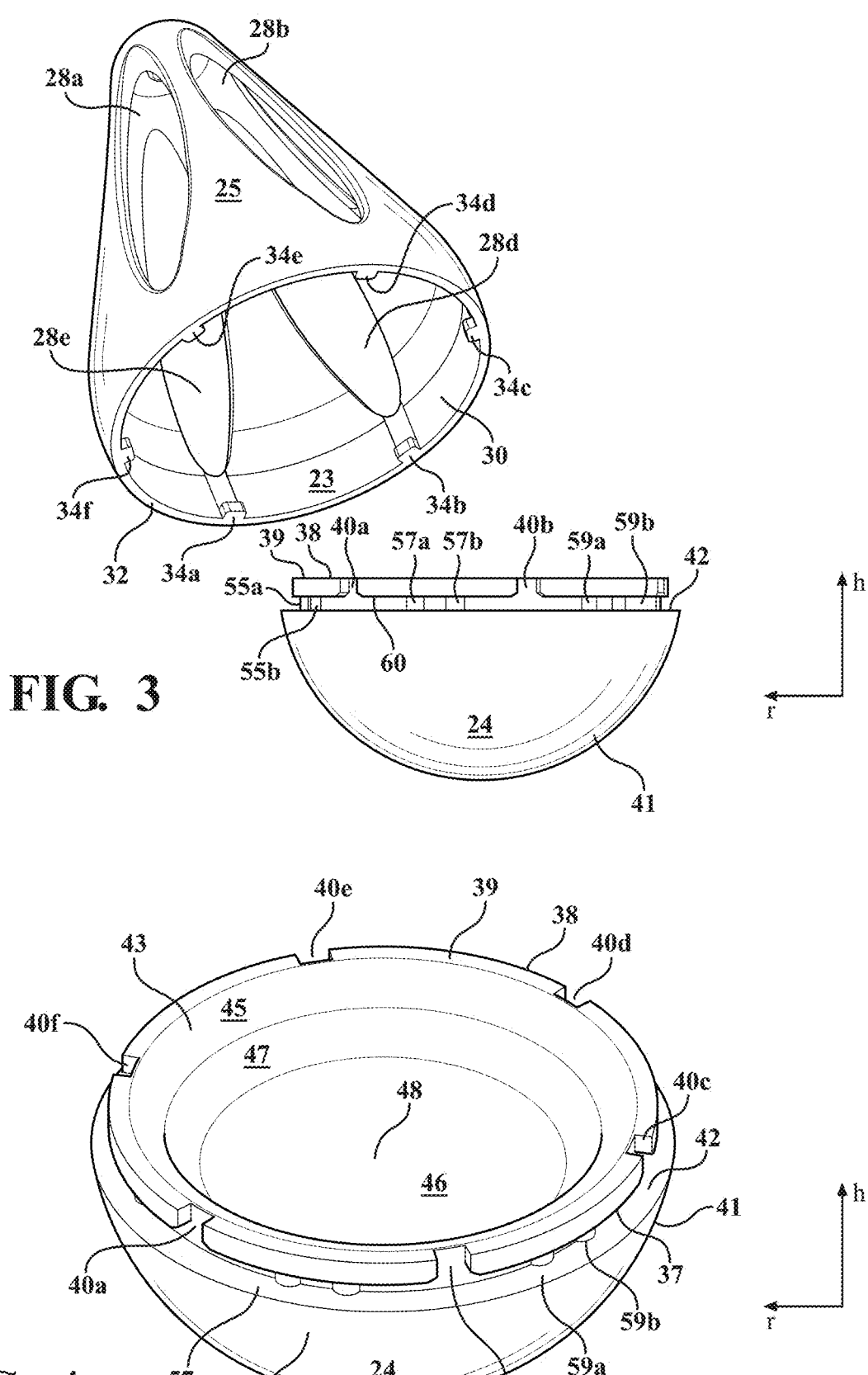
FIG. 3 is an exploded view of the cat toy of FIGS. 1 and 2.
FIG. 4 is a perspective view of the lower hemispherical portion of the cat toy of FIG. 1.

Referring to FIGS. 1-3, upper conical section 22 has an open bottom 30 that leads to a hollow interior 36. Open bottom 30 is defined by a lower circumferential wall 23 which has a downward-facing surface 32. Downward-facing surface 32 abuttingly engages a lip 42 on lower hemispherical section 24. A plurality of tabs 34a-34f project radially inwardly from lower circumferential wall 23 and snap-fittingly engage corresponding notches 40a-40f formed in lower hemispherical section 24.

Lower hemispherical section 24 comprises toy bottom end 28 at the lower most point of lower hemispherical section 24 along the height axis. Toy bottom end 28 is a point of tangency between lower hemispherical section 24 and a support surface on which it rests. Axial flange 38 is spaced apart from toy bottom end 28 along the toy height axis and is located radially inward of exterior surface 41 of lower hemispherical section 24. Axial flange 38 projects away from an adjacent lip 42 along the toy height axis and includes a plurality of radially recessed notches 40a-40f spaced apart from one another around the perimeter of flange 38. Axial flange 38 is radially inward of the outer edge of lip 42 defined by exterior surface 41 of lower hemispherical section 24. Each of notches 40a-40f corresponds to a respective radially-inward projecting tab 34a-34f at open bottom 30 of upper conical section 22.

Lower hemispherical section 24 includes a centrally-recessed planar surface 46 that is radially-inward from adjacent lip 42 and spaced apart from toy bottom end 28 along the height axis. Centrally-recessed planar surface 46 is circumscribed by an inner wall 43 that is defined by flange 38 and which projects away from centrally-recessed planar surface 46 and away from toy bottom end 28 along the height axis. Inner wall 43 includes an upper convex section 45 which is adjacent a lower concave section 47 along the height axis. Lower concave section 47 is located between centrally-recessed planar surface 46 and upper convex section 45 along the height axis. Upper convex section 45 is radially-inward of upward-facing surface 39 of flange 38. Centrally-recessed planar surface 46 is also spaced beneath upward-facing surface 39 of flange 38 along the height axis.

Upper conical section 22 comprises a plurality of through openings 28a-28f which are arranged around the perimeter of upper conical section 22 and which extend from an exterior surface 25 of upper conical section into hollow interior 36. When toy 20 is in an assembled configuration, openings 28a-28f are spaced apart from the centrally-recessed planar surface 46 of lower hemispherical section 24 and from flange 38 along the height axis. The through openings allow the cat to see an attractant, such as a bell, placed in the hollow interior 36 and also reduce the total weight of upper conical section 22, which further enhances the self-righting capability of toy 20. In certain examples, the aggregate open area of openings 28a-28f is from about 25 percent to about 40 percent, preferably from about 30 percent to about 38 percent, and more preferably from about 32 percent to about 36 percent of the surface area of the exterior surface 25 of upper conical section 22.

Figure 5:
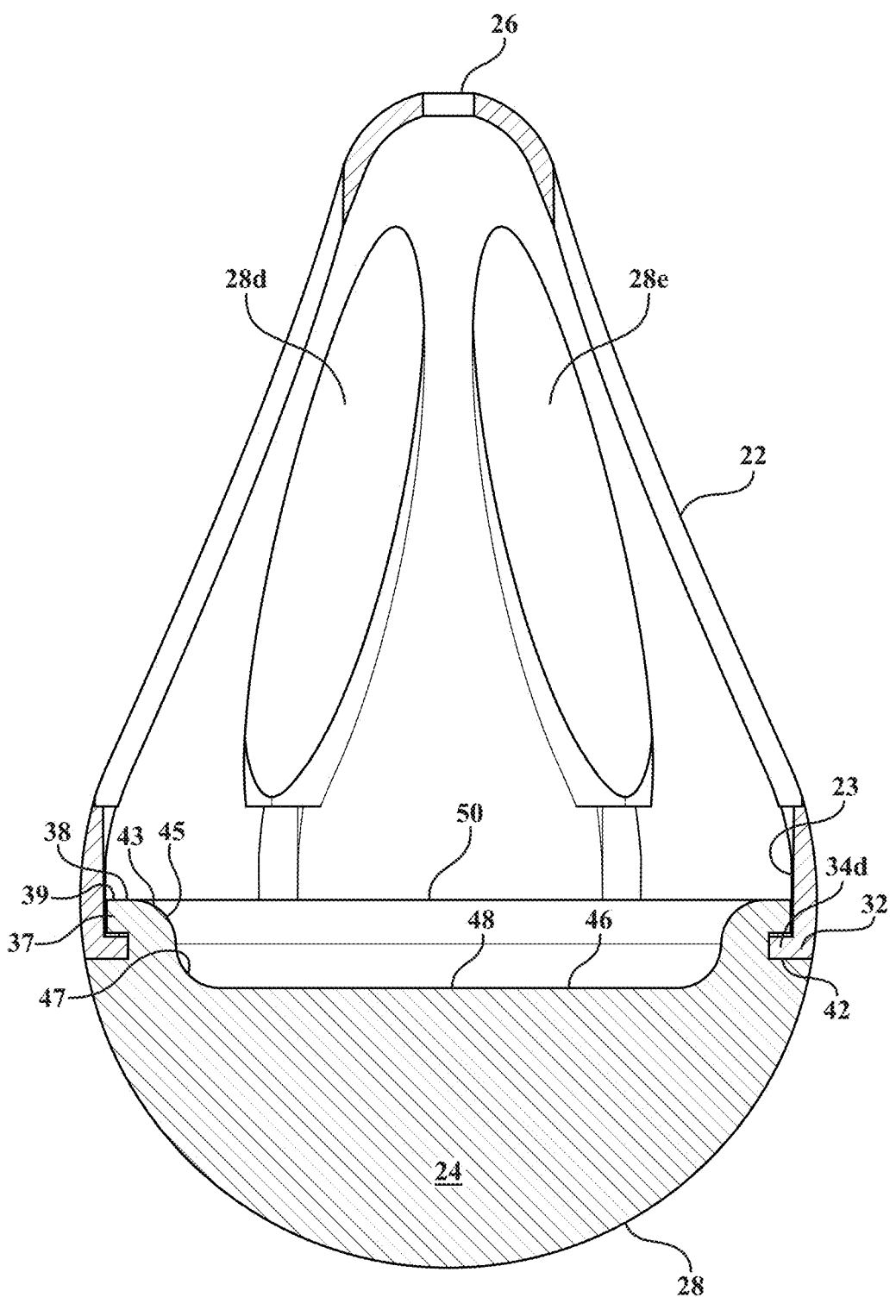
FIG. 5 is a cross-section view taken along line 5-5 in FIG. 2.

One benefit of providing through-openings 28a-28f is that the reduction in mass of the upper conical section 22 lowers the center of gravity of toy 20 relative to its center of rotation, which further enhances the self-righting capability of toy 20. Referring to FIG. 5, center of gravity 48 is located in the radial center of centrally-recessed planar surface 46. Center of rotation 50 lies in the radial center of a plane defined by upward-facing surface 39 of flange 38. In certain examples, the center of rotation 50 is spaced above the center of gravity 48 by a distance along the height axis that is from about five (5) percent to about fifteen (15) percent, preferably from about six (6) percent to about twelve (12) percent, and more preferably from about seven (7) percent to about nine (9) percent of the height of toy 20 along the height axis. In general, increasing the spacing between center of rotation 50 and center of gravity 48 along the height axis reduces the likelihood of "tipping" the toy 20 and enhances the toy's self-righting capability.

A plurality of post pairs 51a/51b (not shown), 53a/53b (not shown), 55a/55b, 57a/57b, 59a/59b and 61a/61b (not shown) connect a downward-facing surface 60 (FIG. 3) of flange 38 and lip 42. The downward-facing surface 60 is actually segmented into a plurality of sections by the notches 40a-40f. The post pairs 51a/51b to 61a/61b are molded features of flange 38, each pair of which corresponds to one of the tabs 34a-34f and locks the respective tab in place. For example, to assemble upper conical section 22 and lower hemispherical section 24, each tab 34a-34f is aligned with one of the notches 40a-40f.

Upper conical section 22 and lower hemispherical section 24 may be attached to one another by snap-fitting engagement. The upper conical section 22 and lower hemispherical section 24 are pressed together to abuttingly engage the downward-facing surface 32 of upper conical section 22 and the upward-facing lip 42 of lower hemispherical section 24. Upper conical section 22 is then rotated relative to lower hemispherical section 24 (or vice-versa) so that the tabs are seated beneath and engage downward-facing surface 60 of flange 38. As rotation continues, each tab 34a-34f will engage a post from among post pairs 51a/51b-61a/61b until seating between the posts in the post pair. The elastomeric nature of the lower hemispherical section 24 allows the posts to deflect slightly inward radially in order to seat the tabs. When each tab 34a-34f is seated between a pair of posts 51a/51b-61a/61b, the lower hemispherical section 24 and upper conical section 22 are in an assembled and locked condition in which the two sections 22 and 24 are locked from movement relative to one another along the height axis and rotation relative to one another about the radial center defined by open bottom n 30 of upper conical section 22. The sections 22 and 24 can be unlocked by applying a sufficient rotational force to upper conical section 22 relative to lower hemispherical section 24 (or vice-versa) to cause the tabs to deflect the post pairs 51a/51b-61a/61b and disengage them. Rotation is then continued until each tab 34a-34f is aligned with a corresponding notch 40a-40f, at which point the upper conical section 22 can be separated from the lower hemispherical section 24 by pulling them apart relative to one another long the height axis.

The separability of the upper conical section 22 and lower hemispherical section 24 allows a user to place a ball, bell, treat, or other attractant in the interior of toy 20. When toy 20 is in an assembled condition, the attractant can rest on centrally-recessed planar surface 46 of lower hemispherical section 24 and is retained in the hollow interior 36 of toy 20 by the inner wall 43 of flange 38 and the lower circumferential wall 23 of open bottom 30 of upper conical section 22. The attractant may be sized to be larger than the smallest axis of openings 28*a*-28*f* to ensure that the attractant remains inside of the toy 20. Further enhancements may also be provided to improve engagement with a cat, including the attachment of feathers to top end 26 of upper conical section 22.

The foregoing descriptions of specific embodiments have been presented for purposes of illustration and description. They are not intended to be exhaustive or to limit the invention to the precise forms disclosed. Many modifications and variations are possible in light of the above teachings, with modifications and variations suited to the particular use contemplated.

What is claimed is:

1. A cat toy, comprising:
a conical upper section having a height defining a height axis and a radial axis;
a hemispherical lower section, wherein the conical upper section is made from a plastic material, and the hemispherical lower section is made from an elastomeric material,
wherein the conical upper section has a bottom defining a conical upper section bottom opening and a top spaced apart along a height axis, the conical upper section has a cross-sectional area perpendicular to the height axis, and the cross-sectional area decreases when moving from the bottom of the conical upper section to the top of the conical upper section along the height axis, wherein the conical upper section bottom opening has a center along a radial axis, and the bottom of the conical upper section comprises a plurality of snap-fit projections projecting toward the center of the bottom opening along the radial axis, the hemispherical lower section has a bottom end spaced apart from an upper end along the height axis, the upper end of the hemispherical lower section comprises an axial flange with a plurality of notches, and each of the notches in the plurality of notches receives and snap-fittingly engages one of the snap-fit projections from the plurality of projections in the conical upper section, and wherein the upper end of the hemispherical lower section comprises a central recessed surface, and the axial flange defines a radially inner wall extending around the central recessed surface and projecting away from the central recessed surface along the height axis.

2. The cat toy of claim 1, wherein the plastic material has a density, the elastomeric material has a density, and the density of the elastomeric material is greater than the density of the plastic material.

3. The cat toy of claim 1, wherein the hemispherical lower section is solid throughout.

4. The cat toy of claim 1, wherein the conical upper section has a hollow interior and through-openings from an exterior surface of the conical upper section to the hollow interior.

5. The cat toy of claim 4, comprising an attractant removably located in the hollow interior.

6. The cat toy of claim 1, wherein the conical upper section is made from an acrylonitrile-butadiene-styrene plastic, and the hemispherical lower section is made from a thermoplastic elastomer.

7. The cat toy of claim 1, wherein the toy has a center of rotation and a center of gravity, and the center of rotation is spaced apart from the center of gravity along the height axis.

8. The cat toy of claim 1, wherein the toy has a center of rotation and a center of gravity, the center of rotation is spaced apart from the center of gravity along the height axis, the axial flange has an upper surface lying in a plane and defining a radial center, and the center of gravity is located at the radial center defined by the axial flange upper surface and in the plane.

9. The cat toy of claim 1, wherein the conical upper section is snap-fittingly engaged to the hemispherical lower section.

10. The cat toy of claim 1, wherein the toy has a center of rotation and a center of gravity spaced apart along the height axis.

11. The cat toy of claim 10, wherein the center of rotation is spaced above the center of gravity along the height axis.

12. The cat toy of claim 11, wherein the hemispherical lower section is solid throughout.

13. A cat toy, comprising:
a conical upper section having a height defining a height axis and a radial axis; and
a hemispherical lower section, wherein the conical upper section is made from a plastic material and the hemispherical lower section is made from an elastomeric material, wherein the conical upper section has a bottom defining a conical upper section bottom opening and a top spaced apart along a height axis, the conical upper section has a cross-sectional area perpendicular to the height axis, and the cross-sectional area decreases when moving from the bottom of the conical upper section to the top of the conical upper section along the height axis, wherein the conical upper section bottom opening has a center along a radial axis, and the bottom of the conical upper section comprises a plurality of snap-fit projections projecting toward the center of the bottom opening along the radial axis, wherein the hemispherical lower section has a bottom end spaced apart from an upper end along the height axis, the upper end of the hemispherical lower section comprises an axial flange with a plurality of notches, and each of the notches in the plurality of notches receives and snap-fittingly engages one of the snap-fit projections from the plurality of projections in the conical upper section, and wherein the hemispherical lower section includes a circumferentially-extending lip that is adjacent to the axial flange, the circumferentially-extending lip includes an outer edge, and the axial flange is located inwardly of the outer edge of the lip along the radial axis.

14. The cat toy of claim 13, wherein the bottom of the conical upper section includes a lower surface facing downward along the height axis, and when the conical upper section is snap-fittingly engaged with the hemispherical lower section, the conical upper section lower surface abuttingly engages the circumferentially-extending lip of the hemispherical lower section.

15. A cat toy, comprising:
a conical upper section having a height defining a height axis and a radial axis; and
a hemispherical lower section, wherein the conical upper section is made from a plastic material and the hemispherical lower section is made from an elastomeric material, wherein the hemispherical lower section is solid throughout, the toy has a center of rotation and a center of gravity spaced apart along the height axis, the center of rotation is spaced above the center of gravity along the height axis, and wherein the conical upper section has a hollow interior and through-openings from an exterior surface of the conical upper section to the hollow interior.

16. The cat toy of claim 15, wherein the conical upper section has a bottom defining a conical upper section bottom opening and a top spaced apart along a height axis, the conical upper section has a cross-sectional area perpendicular to the height axis, and the cross-sectional area decreases when moving from the bottom of the conical upper section to the top of the conical upper section along the height axis.

17. The cat toy of claim 16, where the conical upper section bottom opening has a center along a radial axis, and the bottom of the conical upper section comprises a plurality of snap-fit projections projecting toward the center of the bottom opening along the radial axis.

18. The cat toy of claim 17, wherein the hemispherical lower section has a bottom end spaced apart from an upper end along the height axis, the upper end of the hemispherical lower section comprises an axial flange with a plurality of notches, and each of the notches in the plurality of notches receives and snap-fittingly engages one of the snap-fit projections from the plurality of projections in the conical upper section.

19. The cat toy of claim 15, wherein an upper end of the hemispherical lower section comprises a central recessed surface.

20. A cat toy comprising:
a conical upper section having a height defining a height axis and a radial axis, the conical upper section being formed from a first material having a first density;
a hemispherical lower section formed from a second material having a second density, wherein the second density is greater than the first density, the conical upper section has a hollow interior and through-openings from an exterior surface of the conical upper section to the hollow interior, the hemispherical lower section is solid throughout, and wherein the cat toy has a center of rotation and a center of gravity, and the center of rotation is spaced above the center of gravity along the height axis.

* * * * *